(12) United States Patent
Warner et al.

(10) Patent No.: US 6,634,312 B2
(45) Date of Patent: Oct. 21, 2003

(54) ONE-WAY SELF-CLOSING DRAIN PLUG APPARATUS

(76) Inventors: Jerald R. Warner, 787 Blvd. of the Champions, Shalimar, FL (US) 32579; Christopher M. Palm, 148 Raintree Blvd., Niceville, FL (US) 32588

( * ) Notice: Subject to any disclaimer, the term of this patent is extended or adjusted under 35 U.S.C. 154(b) by 66 days.

(21) Appl. No.: 09/977,166

(22) Filed: Oct. 15, 2001

(65) Prior Publication Data

US 2002/0069811 A1 Jun. 13, 2002

Related U.S. Application Data (60) Provisional application No. 60/240,322, filed on Oct. 16, 2000.

(51) Int. Cl.[7] .............................................. B63B 13/00
(52) U.S. Cl. .................................. 114/197; 114/183 R
(58) Field of Search ........................... 114/183 R, 184, 114/185, 197, 198, 360; 137/614.2, 613

(56) References Cited

U.S. PATENT DOCUMENTS

| 63,496 | A | * | 4/1867 | Fox ............................ 114/185 |
| 412,982 | A | * | 10/1889 | Schenck ...................... 114/212 |
| 422,391 | A | * | 3/1890 | Frost .......................... 114/185 |
| 1,035,199 | A | * | 8/1912 | Klett ........................... 114/185 |
| 1,111,409 | A | * | 9/1914 | Scott ........................ 137/614.2 |
| 1,162,223 | A | * | 11/1915 | Cram ........................... 114/184 |
| 1,221,258 | A | * | 4/1917 | Wilson ........................ 137/465 |
| 1,241,408 | A | * | 9/1917 | Lizarraga .................... 114/185 |
| 1,311,642 | A | * | 7/1919 | Deinert ..................... 137/614.2 |
| 1,344,656 | A | | 6/1920 | Saltsman |
| 1,657,173 | A | * | 1/1928 | Morrison ..................... 210/135 |
| 2,674,948 | A | * | 4/1954 | Roof ........................... 417/96 |
| 2,772,648 | A | * | 12/1956 | De Persia .................... 114/185 |
| 2,929,347 | A | * | 3/1960 | Veltman .................. 114/183 R |
| 3,049,088 | A | | 8/1962 | Curtis |
| 3,289,592 | A | * | 12/1966 | Franzreb ................. 114/183 A |
| 3,394,671 | A | * | 7/1968 | Mayer ..................... 114/183 R |
| 3,491,796 | A | * | 1/1970 | Scaramucci .............. 137/614.2 |
| 3,498,250 | A | * | 3/1970 | Pomorski ................ 114/183 R |
| 4,217,846 | A | * | 8/1980 | Wight ......................... 114/185 |
| 4,594,739 | A | | 6/1986 | Watts |
| 4,649,952 | A | * | 3/1987 | Jobe ....................... 137/614.16 |
| 4,690,169 | A | * | 9/1987 | Jobe ....................... 137/614.16 |
| 5,080,527 | A | | 1/1992 | King, Sr. |
| 5,163,779 | A | | 11/1992 | King, Sr. |
| 5,215,121 | A | * | 6/1993 | Michl ...................... 137/614.2 |
| 5,551,479 | A | * | 9/1996 | Graves ..................... 137/614.2 |
| 6,349,736 | B1 | * | 2/2002 | Dunmire .................. 137/15.19 |

FOREIGN PATENT DOCUMENTS

| GB | 2 134 220 A | 8/1984 |
| JP | 60-078182 | 2/1985 |

* cited by examiner

Primary Examiner—S. Joseph Morano
Assistant Examiner—Ajay Vasudeva
(74) Attorney, Agent, or Firm—Lawrence L. Carnes; J. Ronald Richebourg (57) ABSTRACT

The present invention is a drain plug apparatus designed and configured to remain in the drain hole of a conventional pleasure water vessel, regardless of whether the vessel is in or out of the water. This drain plug apparatus includes a body assembly having at least two chambers. One chamber will house a shut-off valve for enabling the boater to open or close the drain plug apparatus. This will render water to escape or prevent entrance to the boat, respectively. A safety assembly is included in the second and each subsequent chamber. The safety assembly will prevent water passage into the water vessel should the user forget to close the drain plug assembly, prior to placing the boat in water.

13 Claims, 8 Drawing Sheets

ONE-WAY SELF-CLOSING DRAIN PLUG APPARATUS

This is a utility Patent Application for Provisionally Files Application No. 60/240,322 filed on Oct. 16, 2000.

BACKGROUND OF THE INVENTION

1. Field of the Invention

The present invention relates generally to a unique and novel design for a drain plug assembly generally used with small to medium sized water vessels and more particularly to a drain plug apparatus including a self-closing shutoff valve that is designed and configured to enable liquid to exit when desired and will prevent fluid to enter when exposed to any aqueous solution.

2. Description of the Prior Art

As is known, most boats include a drain plug that is located on the lower portion of the transom. The purpose of this plug is to enable water to escape from the boat's bilge. Thus, when the boat is removed from the water, the user can remove the plug and allow all standing water to be removed. Generally, water vessels are removed from the water after each use and stored on a trailer, boatlift, rack in a marina or the like. As is customary, while in storage the plug is left out of the boat to keep the bilge dry.

The most popular drain plug utilized today is a threaded plug that screws into a hole that is located at the lower end of a boat's transom. The vast majority of boat manufacturers use a ½ inch externally threaded brass plug which screws into a matching brass female fitting that is affixed to the existing drain hole. A few boat manufacturers incorporate plugs with non-standard threads, or use plugs of other diameters or materials. Others will incorporate the exterior of the plug with non-threaded rubber material. This plug fabricated from non-treaded rubber is known as a stopper.

In all cases where a plug or stopper is employed, operator intervention is required to dislodge and reinstall the particular device. Though efficient, this conventional form does cause plugs to often be misplaced, lost, or even stolen. Another problem associated with the conventional plug is that there is a chance for the plug to be "cross-threaded" when reinstalled. This "cross-threading" can cause leakage. The most serious problem with conventional drain plugs is that the operators sometimes forget to install them prior to launching the boat. When this occurs, the boat will rapidly fill with water resulting in significant damage, potentially sinking the boat, and inherently placing the passenger's safety in jeopardy.

As such, devices have been developed that will reduce the requirement for operator intervention. For example in U.S. Pat. No. 4,019,454 there is disclosed a ball apparatus that will swing to seal the existing hole when the boat is not in movement. In U.S. Pat. No. 4,198,918 there is disclosed a plug that includes a spring-biased plunger that will be released (in a closed state) by the action of a float mechanism when the boat is lowered in the water. In U.S. Pat. No. 5,385,108 there is disclosed a plug that is hingedly secured to a cap and will swing shut to seal the device when submerged.

Other devices exist on the market that utilize a ball check valve that is either mounted inside or outside the transom drain hole. Still other devices currently marketed use flexible rubber flaps that are shaped to allow water to flow out of the drain but will seal when water attempts to flow in the reverse direction. Though somewhat successful, each method does have a single failure point in the sealing mechanism. The seals can fail if contaminated by common bilge trash (weed, sand, leaves, bugs, or the like). Still other devices have been developed to provide a warning when the plug is removed, for example in U.S. Pat. No. 4,542,373 and U.S. Pat. No. 4,843,376. Though efficient, these devices tend to be costly; difficult to install, and depend on battery power and proper wiring which are both subject to failure.

Though bilge pumps are installed on most water vessels over 16 feet to automatically remove excess water from the boat's bilge, these pumps will only activate when the water level in the boat reaches a pre-set level. These particular pumps are designed to effectively remove water that enters the boat due to rain, slow leaks, wave action, or the like. The pumps, unfortunately, cannot keep up with constant, high-volume in-flow water, such as what occurs when the plug is not replaced in the drain hole of a boat. In addition, these pumps can burn out if kept on for an extended period of time, thereby defeating its purpose. Further the pumps are inactive when there is a power failure.

Accordingly, it is seen that there is a need to provide a drain plug apparatus that will efficiently and adequately enable water to be removed when desired by a boat operator and will automatically close to prevent water from entering the vessel when the boat is in water. Thereby it is seen that there is a need for a plug that is successful in operation yet simple in design.

As will be seen, the present invention achieves its intended purposes, objectives and advantages by accomplishing the needs as identified above, through a new, useful and unobvious combination of component elements, which is simple to use, with the utilization of a minimum number of functioning parts, at a reasonable cost to manufacture, assemble, and test and by employing only readily available material.

SUMMARY OF THE INVENTION

The present invention is a drain plug apparatus designed and configured to remain in the drain hole of a conventional pleasure water vessel, regardless of whether the vessel is in or out of the water. This drain plug apparatus of the present invention will further enable the boater to open or close the drain plug apparatus for allowing the water to escape or prevent entrance to the boat, respectively. A safety assembly is included for prevention of water passage into the water vessel should the user forget to close the drain plug assembly, prior to placing the boat in water.

In order to provide for such a configuration, the present invention comprises body assembly having an inlet end, an outlet end and a central portion sandwiched therebetween. The inlet end is a hollow structure that is secured to the existing drain hole of the conventional boat. To enable attachment, the exterior of the inlet end includes attaching features that correspond to the existing hole. Thereby providing for the exterior to be threaded fabricated from rubber or the like.

A hollow channel extends from the inlet, central portion and outlet of the interior of the body assembly. Thereby providing for water to travel through the channel from the inlet, through the central portion and exit the outlet end. Located in the central portion or central chamber is a valve assembly. This valve assembly, known as the shut-off valve is controlled via a lever located exteriorly therefrom. The user can open (fluid flow permitted) or close (fluid flow prohibited) the assembly via this lever. To prevent water from entering the apparatus from the outlet when the device is in water, the outlet houses a check valve assembly.

To enhance the present invention the handle of the shut-off valve is structured such that when the unit is left in an open position when the boat is placed in water and in operational mode, the boat starts to move and this movement in combination with the flow of the water applies pressure to the outer surface of the handle. This pressure forces the handle to move to innately cause the valve to close.

Other features that can be added to the present invention include a filter, located at the inlet end. This filter will prevent debris from entering into the drain plug assembly of the present invention. In addition, adding to the safety, a second check valve can be located at the inlet end. This will provide for an additional valve chamber to be located therein for housing the additional valve. Further, to increase the life span of the present invention, any one or all of the components can be fabricated from or coated with an anti-rusting material.

Accordingly, it is an object of the present invention to provide a drain plug assembly apparatus that will overcome the deficiencies, shortcomings, and drawbacks of prior drain plugs and methods thereof Another object of the present invention is to provide a drain plug apparatus that can successfully and efficiently accommodate any type or style of water vessel having a drain hole located therein.

Still a further object of the present invention is to provide for a drain plug apparatus that will successfully enable water to flow therefrom when desired and will prevent water from entering even when in water and the shut-off valve is in an opened position.

Yet a further object of the present invention, to be specifically enumerated herein, is to provide a drain plug apparatus in accordance with proceeding objects and which will conform to conventional forms of manufacture, be of simple construction and easy to use so as to provide a drain plug apparatus that would be economically feasible, long lasting and relatively trouble free during utilization.

Although there have been many inventions related to drain plugs, none of the inventions have become sufficiently compact, low cost, or reliable enough to become used repeatedly. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
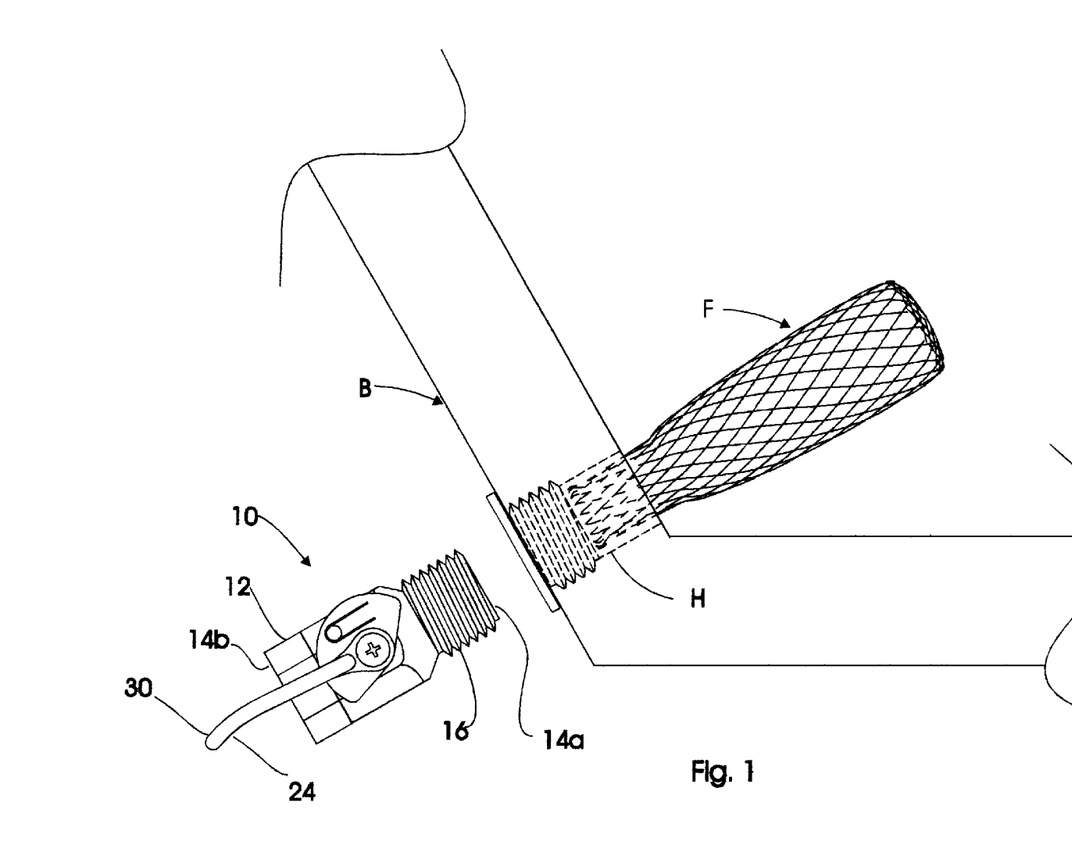
FIG. 1 is a side view of the drain plug apparatus illustrating attachment to an existing drain hole of a conventional water vessel.

With reference to the drawings, in particular to FIGS. 1–7 thereof, the present invention, a drain plug apparatus, denoted by reference numeral 10 will be described. Shown is a drain plug apparatus 10 that is designed and configured to be attached to the existing drain hole of a boat. The attachment occurs exteriorly, as shown in FIG. 1. The drain plug apparatus 10 of the present invention is structured so that it will remain in the drain hole of a conventional pleasure water vessel, regardless of whether the vessel is in or out of the water. In use, the present invention will enable the boater to open or close the drain plug apparatus for allowing the water to escape or prevent entrance to the boat, respectively. A safety assembly is included for prevention of water passage into the water vessel should the user forget to close the drain plug assembly, prior to placing the boat in water.

In order to provide for such a configuration, the present invention 10, as seen in FIG. 1, includes a body assembly 12 having outer ends 14a and 14b. The outer ends are open to provide for the ends to act as inlet and outlet ends. As seen in FIG. 1, end 14a acts as the inlet end and end 14b acts as the outlet end.

As illustrated in FIG. 1, the exterior of the first end 14a includes an attaching element 16, known as the transom's connector, that enables this end to be attached to the existing drain hole H of a conventional boat B. Thereby providing for an attaching element that corresponds to the existing hole located within the boat. As shown, the attaching element includes external threads that are designed to be threadably attached to the drain hole having internal threads. Optionally, the external end can be fabricated from rubber or the like to provide for the device to be frictionally held so as to provide for a device that can be secured to a drain hole that does not include internal threads.

The body assembly is hollow and includes at least two chambers. This illustration of two chambers is shown in FIGS. 2a–2d. Each chamber 18a and 18b includes open ends, as shown, that are divided via washer shaped seats 20. This will provide for the open ends to be smaller in diameter than the diameter of the actual chamber. The outlet 14c of the first chamber is the inlet 14c for the second chamber. The inlet of the first chamber is the inlet 14a of the present invention. The outlet 14b of the second chamber 18b is the outlet for the present invention.

Figure 2A:
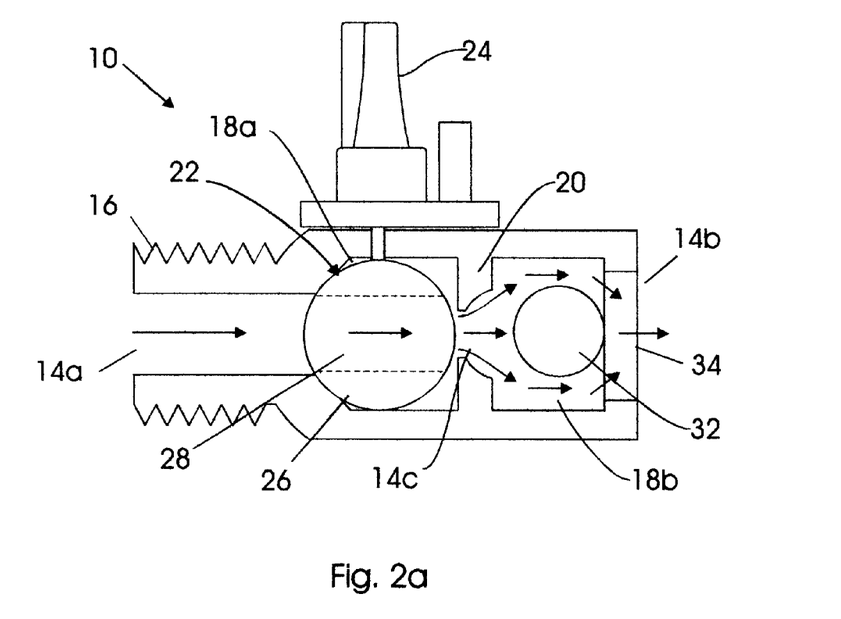
FIG. 2a is a simplified cross-sectional view of the components used in the drain plug apparatus having two chambers and illustrating the flow path of water when the drain plug apparatus is in an open position.
Figure 2B:
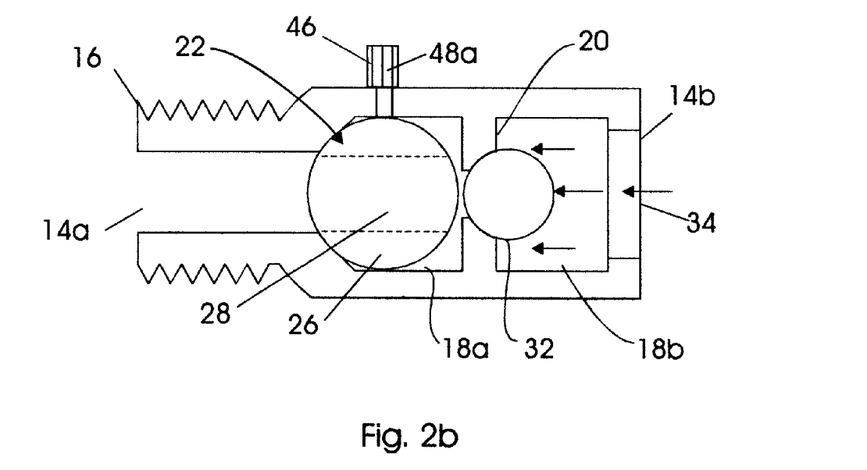
FIG. 2b is a simplified cross-sectional view of the components used in the drain plug apparatus having two chambers and illustrating the blockage of fluid flow even though the valve is in an open position.
Figure 2C:
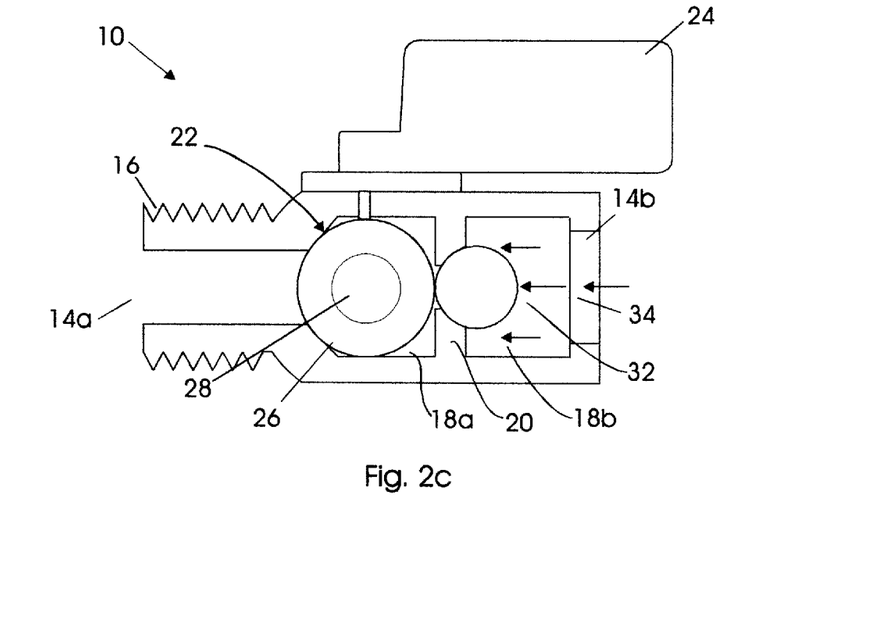
FIG. 2c is a simplified cross-sectional view of the components used in the drain plug apparatus having two chambers and illustrating the blockage of fluid flow when the valve is in a closed position.

In the first chamber 18a, a valve assembly 22 is housed therein. This valve assembly 22 is a lever-actuated valve that is designed and configured to be controlled by the boater. Thus, this lever-activated valve includes a lever or handle 24 that is coupled to a ball 26 that includes a channel 28 located therein. Coupling the handle to the ball is a pivot pin, illustrated, but not labeled, that allows rotation on an axis that is perpendicular to the axis of the chamber. The handle controls the movement of the ball and thus will provide for the channel 28 to be either aligned (open position) with the open ends, as seen in FIGS. 2a and 2b, or to block the open ends of its respective chamber, as seen in FIG. 2c. When in an open position, the handle will be substantially perpendicular to the channel, shown in FIG. 2a. When turned approximately 90 degrees, the ball will block the open ends and will provide for the handle to be located horizontally and substantially parallel with respect to the housing (see FIGS. 1, 2c, 5a, 5b and 6e). This means of opening and closing the lever actuated valve is specifically designed for this application and is the opposite to the motion found on conventional ball valve assemblies. In addition, a catch mechanism is provided on the manually operated handle so as to prevent the handle from opening by propeller wash that is generated when the boat engine is reversed.

Figure 2D:
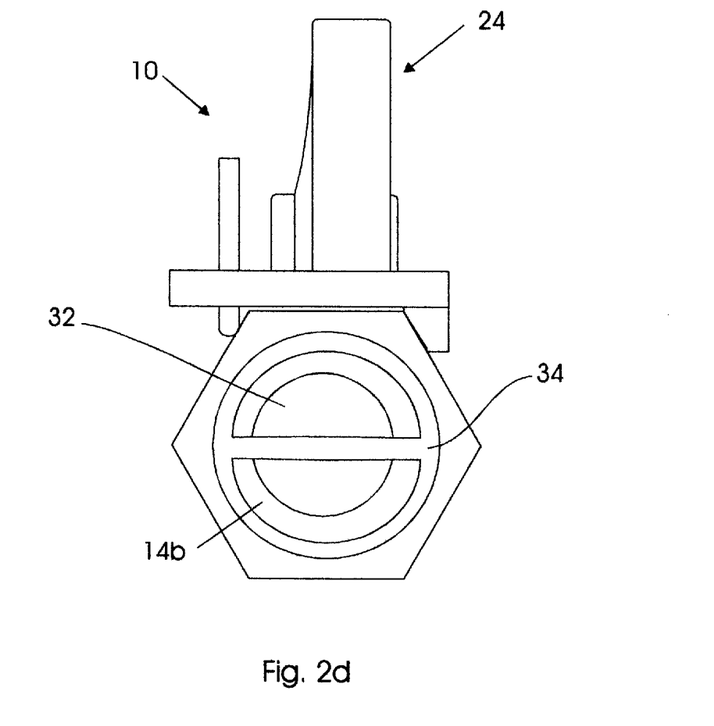
FIG. 2d is a rear view (outlet) illustrating the opening at the second end of the drain plug apparatus of the present invention when the valve is in an closed position.

The handle, as seen in FIGS. 1–2d includes a unique structure. This handle 24 is designed such that should the user place the boat in water when the drain plug apparatus 10 is in an open position and exteriorly located, and operation of the vessel continues, the motion of the water in combination with the motion of the boat will force the handle to rotate and close. This is accomplished by the shape and arrangement of the handle. As seen in the figures, the handle 24 includes a paddle-like configuration, so as to provide for a front surface to include a large surface area and include an outer end 30 that is curved. This curved portion is illustrated in FIG. 1. When the lever actuated valve 22 is open, this handle will be located substantially perpendicular to the housing. This will provide for the enlarged surface area to be located perpendicular, with respect to the boat. This positioning will innately provide for water to contact this surface. This motion of water contacting the enlarged surface will provide for the water to apply a force on the handle. The force will cause the handle to move. Movement is continued until the enlarged area is substantially parallel to the housing, intrinsically causing the handle to be located parallel to the housing (see FIGS. 1 and 2c). Consequently forcing the ball of the valve to rotate and be in a closed position. In essence, the motion of the water will cause the handle to close when the boat is in motion.

Preventing water from entering the boat via the drain hole when submerged therein is a concern that the present invention addresses. In order to avoid water entrance when the lever-activated valve 22 is left open, a safety is provided. This safety will prevent water from entering the inlet of the present invention to inherently prevent water from entering the boat. To provide for such a configuration, the second chamber 18b includes a check valve assembly. In this check valve chamber 18b, a ball 32 is provided. This ball is sized larger than the outlet 14c of the first chamber (or inlet of the second chamber), yet smaller than the outlet of the second chamber 14b. To prevent the ball from escaping from the second chamber 18b, a retaining pin 34 is located at the outlet 14b. The pin will prevent the ball from escaping yet will still allow for water flow. This arrangement provides for the ball to remain within the chamber yet move freely about therein.

Thus, as seen in FIG. 2a, when the shutoff valve 22 is in an open position, water from the inside of the boat will flow through the transom connector, and through the channel 28. The water will travel to the check valve chamber and push the ball to the rear or to the outlet end 14b of the assembly 10. The ball-retaining pin 34 prevents the ball from exiting the chamber. Water will pass around the ball and retaining pin to provide for the water to exit at this end 14b.

Should the boat be placed in water and the shut-off lever is in an open position, the check valve will prevent water from entering therein. This is seen in FIG. 2b, wherein as the boat is lowered into the water, water will enter through the outlet opening 14b and around the retaining pin 34. The water will force the ball towards the front of the check valve chamber and into the seat 20 between the first and second chambers. This will create a seal and prevent water from passing further into the assembly.

Figure 3A:
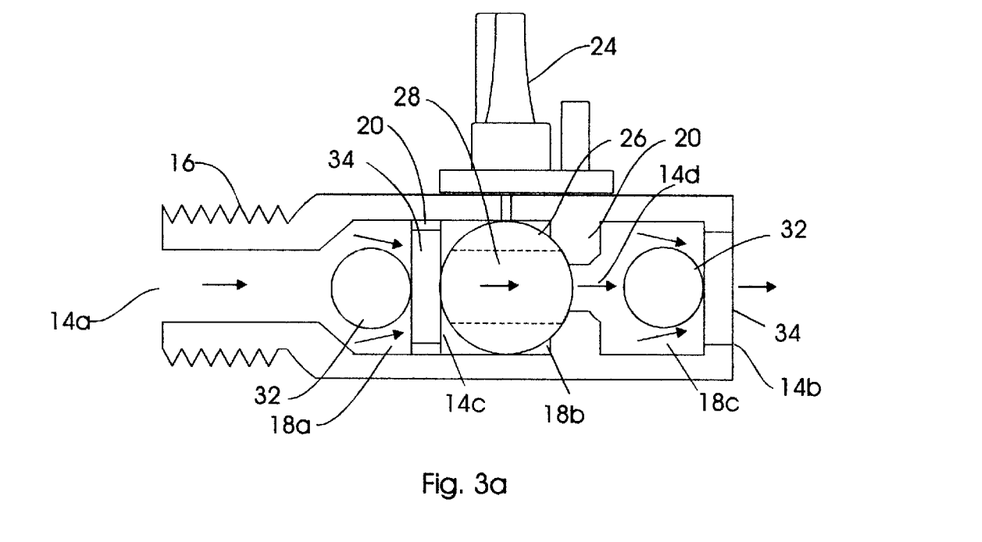
FIG. 3a is a simplified cross-sectional view of the components used in the drain plug apparatus having three chambers and illustrating the flow path of water when the drain plug apparatus is in an open position.
Figure 3B:
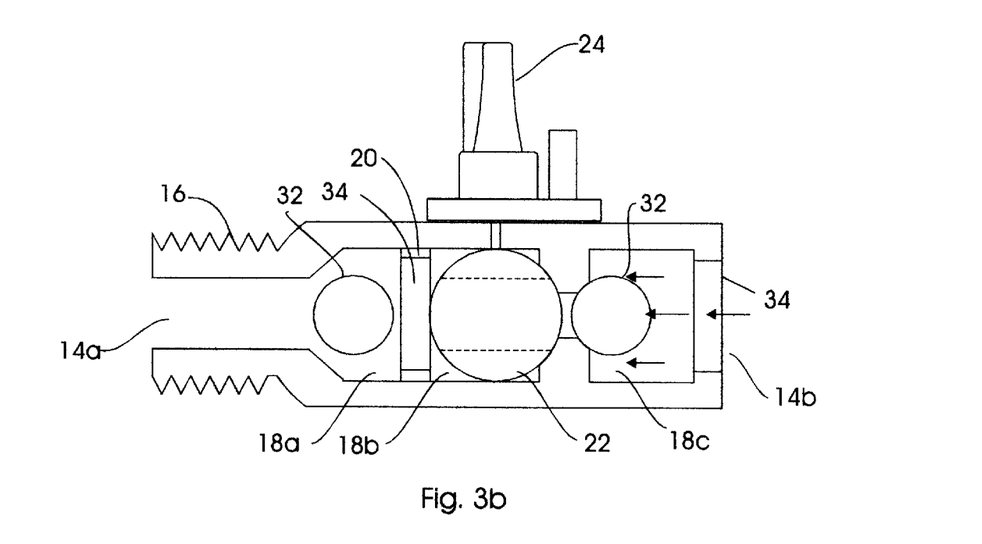
FIG. 3b is a simplified cross-sectional view illustrating of the components used in the drain plug apparatus having three chambers and illustrating the blockage of fluid flow even though the valve is in an open position.
Figure 3C:
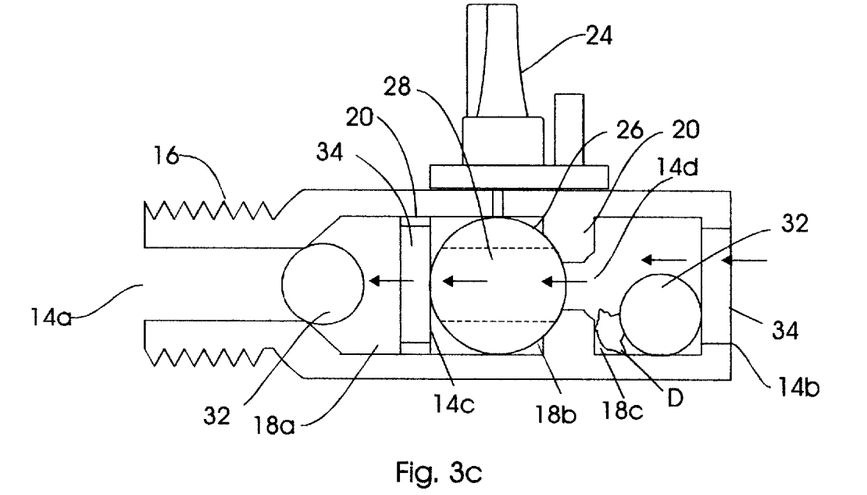
FIG. 3c is a simplified cross-sectional view illustrating of the components used in the drain plug apparatus having three chambers and illustrating the blockage of fluid flow even though the valve is in an open position and debris has caused the first safety to remain in an open position.

For added security and for further enhancing the present invention, should debris or the like prevent the check valve assembly from functioning correctly, a second check valve assembly can be provided. This alternation is illustrated in FIGS. 3a–3c. As seen, the drain plug apparatus 10 would include three chambers 18a, 18b and 18c. Each chamber includes open ends, as shown, that are divided via washer shaped seats 20. This will provide for the open ends to be smaller in diameter than the diameter of the actual chamber. The inlet of the first chamber is the inlet 14a of the present invention. The outlet 14b of the third chamber 18c is the outlet for the present invention. The outlet of the first chamber 14a is the inlet of the second chamber 18b. The outlet 14d of the second chamber 18b being the inlet of the third chamber 18c.

Structurally, the second chamber 18b housing the lever activated valve or shutoff valve 22, is substantially the same as described above. Thus, this lever-activated valve includes a lever or handle 24 that is coupled to a ball 26 that includes a channel 28 located therein. Coupling the handle to the ball is a pivot pin, illustrated, but not labeled, that allows rotation on an axis that is perpendicular to the axis of the chamber. The handle controls the movement of the ball and thus will provide for the channel 28 to be either aligned (open position) with the open ends, as seen or to block the open ends of its respective chamber.

Located in the first chamber 18a and third chamber 18c is a check valve assembly. This configuration will provide for the lever-activated valve to be sandwiched between check valve assemblies. This arrangement of including a check valve assembly at both the inlet end and outlet end of the apparatus will subsequently increase the overall reliability should one of the check valve assemblies fail.

The first chamber and third chamber are substantially the same and include substantially the same configuration as described for the check valve assemblies above. Thus, each chamber houses a ball 32. This ball is sized larger than its respective inlet, yet smaller than its respective outlet. To prevent the ball from escaping from the outlet end of the respective chamber 18a and 18c, retaining pins 34 are located therein. This will provide for the outlet of the first chamber and the outlet of the third chamber to include retaining pins for preventing the ball from escaping yet will still allow for water flow. This arrangement provides for the ball to remain within the chamber yet move freely about therein. The first chamber further includes an attaching element 16, known as the transom's connector that enables this end to be attached to the existing drain hole of a conventional boat.

In use, if the shutoff valve 22 is in the open position, as seen in FIG. 3a, water from the inside of the boat will flow through the transom connector 16, push the first ball 32 of the first chamber 18a to the rear of the inlet side of the check valve chamber 18a. The ball-retaining pin 34 will prevent the ball from exiting the chamber and sealing off the entrance to the shutoff valve. Water will pass around the ball and retaining pin, pass through the open shutoff valve 22 and enter into the outlet-side check valve chamber 18c. The moving water will push the ball 32 to the retaining pin, which will prevent the ball from exiting the outlet of the check valve chamber. Water will flow around the ball and retaining pin and exit the assembly through the outlet 14b.

Should the boat be placed in water and the shut-off lever is in an open position, such as when the operator forgets to manually close the shutoff valve, the present invention will prevent water from entering therein, as shown in FIG. 3b. When the boat is lowered into the water, water will enter through the outlet hole 14b, around the ball-retaining pin 32 of the third chamber 18c, and into the outlet check valve chamber 18b. Movement of the water will push the ball 32 against the valve seat 20 creating a seal and preventing water from passing further into the assembly. If debris D or other contamination cause failure of the valve seat, as shown in FIG. 3c, the water will flow through the open shut-off valve and pass into the inlet side check valve 18a, which serves as a back up to increase over reliability of the device. Water will pass around the inlet side of the check valve and through the ball-retaining pin and into the inlet side of the check valve chamber 18a. Movement of the water will push the plastic ball against the valve seat creating a seal and preventing water from passing into the boat through the transom connector 16.

Figure 4:
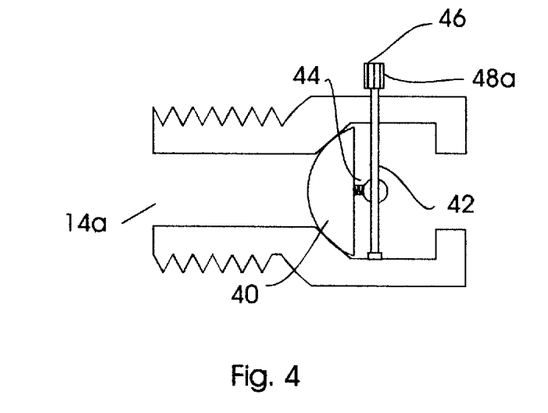
FIG. 4 is an example of an alternative configuration for a shut-off valve assembly that can be used with the present invention.

The lever-activated valve 22, as described for the assemblies having two or three chambers as defined above can be altered for conforming to any conventional lever activated valve assembly without departing from the scope of the invention. For example, as illustrated in FIG. 4, there is provided an alternative embodiment for the lever activated valve assembly of the present invention. As seen, the shutoff valve body 22 is shown, as having a blockage member 40 that is secured via a shaft to a shank that constitutes the shutoff valve body 42. The blockage member can include any configuration and it is shown to be half a circle. Secured to body 42 is the handle 24. A spring, O-ring, or the like 44 can be located on the shaft to apply pressure on the rotating member to enhance the sealing properties. Thus, in use the user can rotate the blockage member away from the inlet/outlet for enabling fluid flow to occur therein.

For enhancing the present invention, a filter F can be utilized for preventing debris or the like from entering into the drain plug apparatus 10 of the present invention. This filter includes an open end and an enclosed end. As seen in FIG. 1, the filter can be inserted into the boat transom's drain hole from either the inside or outside of the boat. If inserted from the inside of the boat, the open end of the filter F is compressed and inserted into the interior side of the drain hole. The filter is composed of a springy nylon mesh so that the portion that remains in the drain hole will expand and hold itself in place when released. If inserted from the outside of the boat, the closed end of the filter is inserted into the drain hole from the exterior of the drain hole. Once again, the debris filer is inserted so that at least two inches of filter extends into the interior of the boat and the portion that remains in the drain hole will expand and hold itself in place when released. Preferably, the mesh is sized to allow for ⅛ of inch debris to pass therethrough.

For added safety, the handle can include additional features that will add to the protection of the valve for inherently adding to the protection of the particular vessel. The handle couples to the shut-off valve via a valve pin 46. This valve pin is illustrated in FIG. 2b and FIG. 4. This pin 46 includes a plurality of notches or splines 48a that provide for a star like configuration. The handle will receive the pin and thus includes an opening having a plurality of splines 48b that are adapted to mate with the splines of the pin as seen in FIG. 5b. Proper mating will guarantee proper placement of the handle to the pin. In addition, this will provide for a handle that is correctly secured so as to efficiently and adequately grip the pin. Once located thereon, a screw or the like is inserted into the hollow seat 50 of the handle and the hollow shaft of the pin for securing it thereto, illustrated in FIGS. 5a and 5b.

Figure 5A:
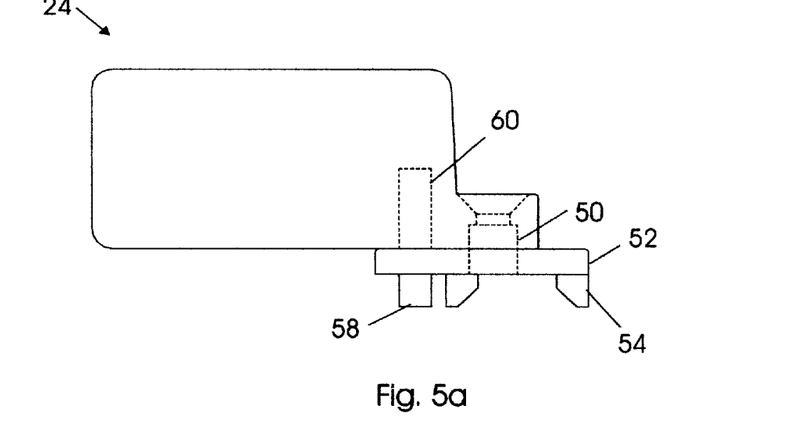
FIG. 5a is a side view of the handle of the shut-off valve assembly used in the drain plug apparatus of the present invention.
Figure 5B:
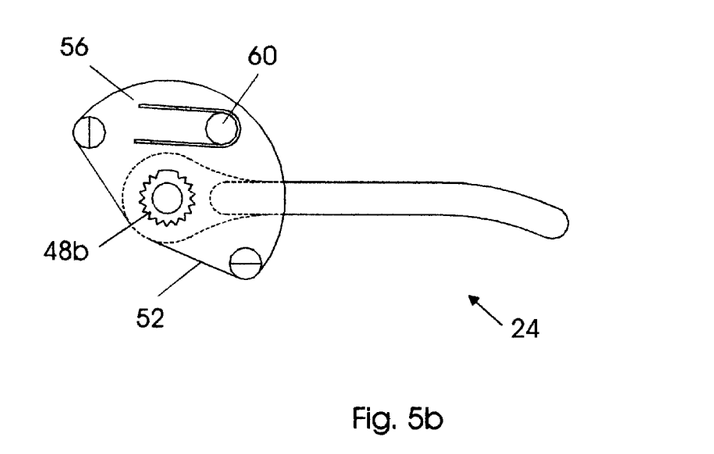
FIG. 5b is a top side view of the handle of the shut-off valve assembly used in the drain plug apparatus of the present invention.
Figure 5C:
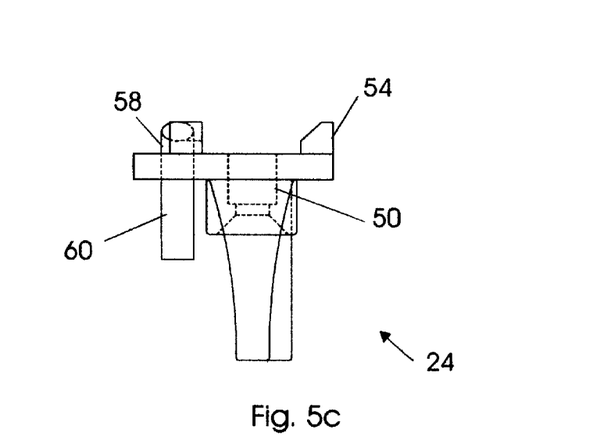
FIG. 5c is a front view of the handle of the shut-off valve assembly used in the drain plug apparatus of the present invention.

Secured to the lower portion of the handle 24 and extending outwardly therefrom is a substantially semi-circular projection member 52, as seen in FIGS. 5a, 5b and 5c. This flange includes a lower surface having a plurality of feet 54. The feet aid in the rotational control of the handle by preventing rotation of the handle beyond the fully open and fully closed position. These feet can be tapered as illustrated.

Figure 7:
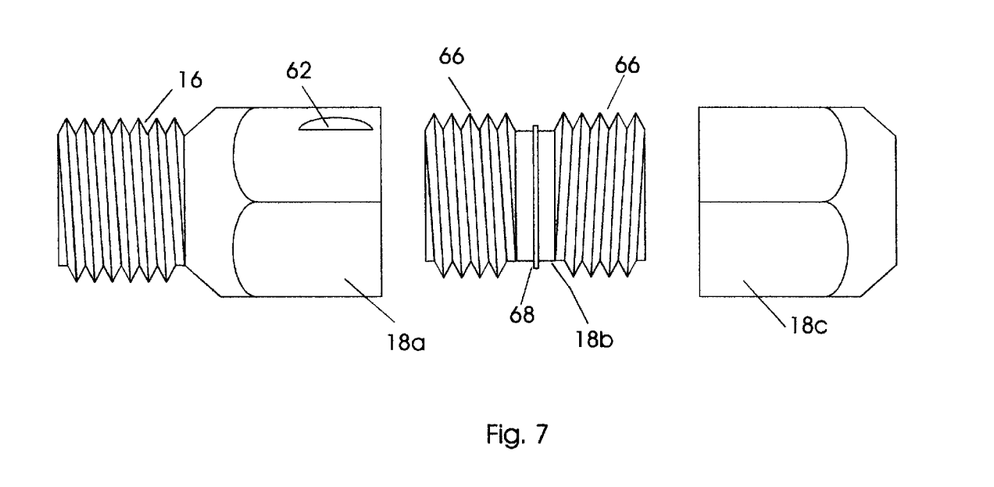
FIG. 7 is a side view of the drain plug apparatus of the present invention in a non-assembled configuration.

Extending through this projection member is a U-shape member 56 having a catch pin 58 and release pin 60 therein. This configuration renders a close-position catch mechanism. The catch mechanism along with an indentation 62, in the valve body, shown in FIG. 7, provide a means to prevent the valve from opening without operator intervention. This feature is important because it prevents propeller wash from opening the valve when the engine is reversed.

Figure 6A:
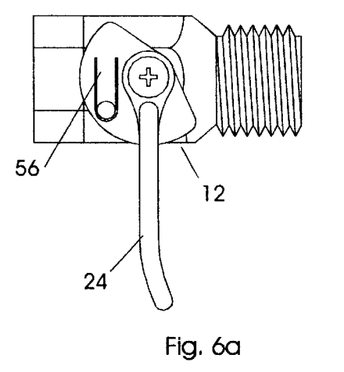
FIG. 6a is a side view of the drain plug apparatus of the present invention in an opened position.
Figure 6B:
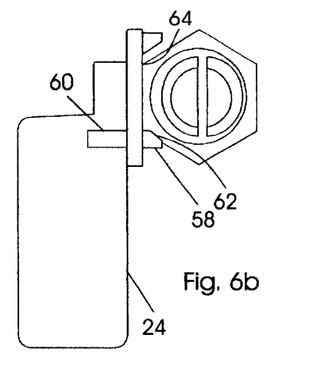
FIG. 6b is a front view of the drain plug apparatus of the present invention, as seen in FIG. 6a, in an opened position.
Figure 6C:
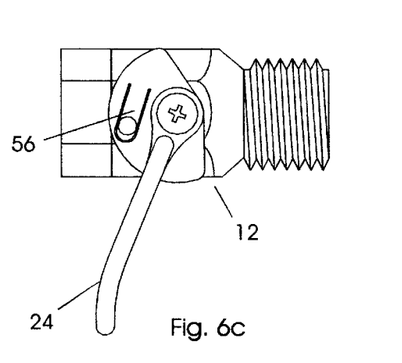
FIG. 6c is a side view of the drain plug apparatus of the present invention being rotated towards the closed position.
Figure 6D:
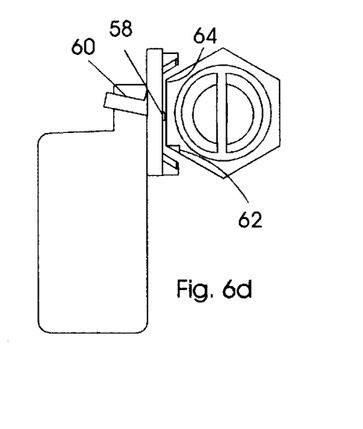
FIG. 6d is a front view of the drain plug apparatus of the present invention, as seen in FIG. 6c, being rotated towards a closed position.
Figure 6E:
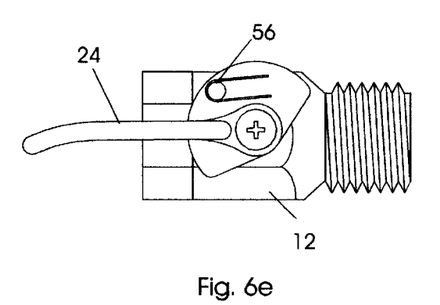
FIG. 6e is a side view of the drain plug apparatus of the present invention in a closed position.
Figure 6F:
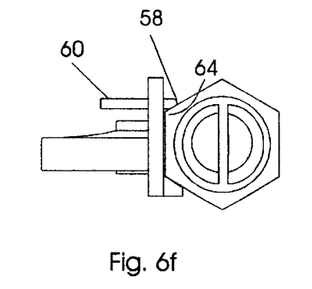
FIG. 6f is a front view of the drain plug apparatus of the present invention, as seen in FIG. 6e, in a closed position.

When the valve is in the fully open position as shown in FIG. 6a and 6b, the catch pin 58 extends beyond the edge of the valve body 12. As the handle is rotated towards the closed position shown in FIGS. 6c and 6d, the U-shape channel 56 flexes to allow the catch pin 58 to slide over the corner 64 of the valve body 12. The catch pin 58 is angled to allow smooth movement over the corner 64. When the handle is rotated to the fully closed position; FIGS. 6e and 6f, the catch pin extends into a matching indentation 62 in the valve body. The shape of the catch pin 58 and indentation 62 prevent opening the valve by simple rotation of the valve handle 24. A release pin 60 is provided with the catch mechanism to provide a means to flex the U-channel and thus extract the catch pin 58 from the indentation 62. The operator can apply pressure to the release pin 60 to extract the catch pin 58 from the indentation 62, while simultaneously pressing downward on the handle 24 to rotate the valve handle from the closed to the open position. The U-channel 56 is positioned so that it is only flexed when the lever is transitioning from closed to open or from open to closed positions. This prevents the U-channel from resting in the flexed position during normal operations, to inherently prevent the catch mechanism from loosing its "springy" nature.

The body assembly can be an integral structure or optionally, can be removable members, as seen in FIG. 7. This will provide for each chamber to be a removable member. Mating devices 66 will be located thereon for enabling chambers to be removably secured to one another. Optionally, O-ring 68 or the like can be added for preventing leakage or the like. Optionally, the outer ends can include internally (not illustrated) or externally threaded members (as shown) for enhancing assembly and attaching to the existing aperture of the boat.

While the invention has been particularly shown and described with reference to an embodiment thereof, it will be understood by those skilled in the art that various changes in form and detail may be made without departing from the spirit and scope of the invention.

We claim:

1. A one-way self-closing drain plug assembly for a boat comprising:
   a hollow body assembly having an inlet and an outlet;
   at least two chambers being located in said hollow body assembly;
   a first chamber houses a valve assembly including a manual mechanism for opening and closing said valve assembly, wherein said manual mechanism includes a handle coupled to said valve assembly for opening and closing thereof, and said handle is shaped into a paddle that, when in the open position, is disposed perpendicular to the longitudinal axis of said boat, whereby said valve assembly is automatically closed when left open and when exposed to moving fluid caused by movement of said boat;
   a second chamber houses a safety device; and
   said safety device enables fluid flow to occur in one direction and prevent fluid flow from an opposite direction by blocking access to said first chamber regardless of the position of said valve assembly.

2. A drain plug assembly as in claim 1 wherein said first chamber includes said inlet and said second chamber includes said outlet.

3. A drain plug assembly as in claim 1 wherein a filter is secured to said inlet for catching debris.

4. A drain plug assembly as in claim 1 wherein said paddle includes a front surface having a large surface area and an outer end that is curved so as to scoop said fluid as said boat moves forward.

5. A drain plug assembly as in claim 1 wherein a third chamber is provided and said third chamber houses a second safety device.

6. A drain plug assembly as in claim 5 wherein said first chamber is sandwiched between said second chamber and said third chamber.

7. A drain plug assembly as in claim 1 wherein said handle further includes a plurality of legs secured thereto and in contact with said hollow body assembly for providing rotational control of said handle.

8. A drain plug assembly as in claim 1 wherein said handle includes a catch mechanism so as to prevent said handle from opening via propeller wash that is generated when a boat engine is reversed.

9. A drain plug assembly as in claim 8 wherein said catch mechanism includes a flange member, extending through said flange member is a U-shape member having a catch pin and a release pin secured thereto, an indentation is located on said hollow body, said catch pin when in contact with said indentation prevents further movement of said handle and said release pin enables release of said catch pin from said indentation for manual rotation of said handle.

10. A drain plug assembly as in claim 9 wherein said catch pin is tapered.

11. A drain plug assembly as in claim 1 wherein said first chamber includes an attaching device for enabling attachment to a drain hole on said boat.

12. A one-way self-closing drain plug assembly for a boat comprising:
    a hollow body assembly having an inlet and an outlet;
    a first chamber, a second chamber and a third chamber are located in said hollow body assembly;
    said second chamber houses a valve assembly and is sandwiched between said first chamber and said third chamber;
    said valve assembly includes a manual mechanism for opening and closing said valve assembly;
    said first chamber and said third chamber each houses a safety device;
    said safety device in said first chamber and said third chamber enables flow to occur in one direction and prevent flow from an opposite direction by blocking access to an inlet end of each chamber and regardless of the position of said valve assembly; and
    an attaching device is secured to said first chamber and enables said first chamber to be secured to a drain hole located on said boat.

13. A drain plug assembly as in claim 12 wherein a filter is removably secured to said first chamber, opposite attachment from said second chamber.

* * * * *